US011609915B2

(12) United States Patent
Mai et al.

(10) Patent No.: US 11,609,915 B2
(45) Date of Patent: Mar. 21, 2023

(54) EFFICIENT SET OPERATION EXECUTION ON STREAMING DATA USING SKETCHES

(71) Applicant: ADOBE INC., San Jose, CA (US)

(72) Inventors: Tung Mai, San Jose, CA (US); Anup Rao, San Jose, CA (US); Yeshwanth Vijayakumar, San Jose, CA (US)

(73) Assignee: ADOBE INC., San Jose, CA (US)

( * ) Notice: Subject to any disclaimer, the term of this patent is extended or adjusted under 35 U.S.C. 154(b) by 108 days.

(21) Appl. No.: 17/201,451

(22) Filed: Mar. 15, 2021

(65) Prior Publication Data

US 2022/0292101 A1 Sep. 15, 2022

(51) Int. Cl.
G06F 16/00 (2019.01)
G06F 16/2455 (2019.01)
G06F 16/23 (2019.01)
G06F 16/22 (2019.01)
G06F 16/2453 (2019.01)

(52) U.S. Cl.
CPC .... G06F 16/24568 (2019.01); G06F 16/2255 (2019.01); G06F 16/2365 (2019.01); G06F 16/24539 (2019.01); G06F 16/24554 (2019.01)

(58) Field of Classification Search
None
See application file for complete search history.

(56) References Cited

U.S. PATENT DOCUMENTS 8,166,047 B1 * 4/2012 Cohen .................. G06F 16/245
707/748

OTHER PUBLICATIONS

Andrei Z. Broder, Moses Charikar, Alan M. Frieze, and Michael Mitzenmacher. Min-wise independent permutations (extended abstract). In Proceedings of the Thirtieth Annual ACM Symposium on Theory of Computing, STOC '98, p. 327-336, New York, NY, USA, 1998. Association for Computing Machinery.
Edith Cohen and Haim Kaplan. Summarizing data using bottom-k sketches. In Proceedings of the Twenty-Sixth Annual ACM Symposium on Principles of Distributed Computing, PODC '07, p. 225-234, New York, NY, USA, 2007. Association for Computing Machinery.
Ted Dunning and Otmar Ertl. Computing extremely accurate quantiles using t-digests. ArXiv, abs/1902.04023, 2019.
Anirban Dasgupta, Kevin Lang, Lee Rhodes, and Justin Thaler. A framework for estimating stream expression cardinalities. In Proceedings of the 2016 International Conference on Database Theory, 2016.

(Continued)

*Primary Examiner* — Anhtai V Tran
(74) *Attorney, Agent, or Firm* — F. Chau & Associates, LLC

(57) ABSTRACT

The present disclosure relates to method for responding to a query requesting an intersection being performed. The method includes receiving a query referencing a first set, a second set, and a desired quantile related to the first set from among a plurality of quantiles; generating a data structure including a bottom-k sketch of user identifiers (ids) of the first set and corresponding numerical values of the first data; partitioning the data structure into a plurality of sketches to correspond to the quantiles, respectively; determining an intersection of one of the sketches associated with the desired quantile and a sketch of the second set; and responding to the query based on the intersection.

20 Claims, 5 Drawing Sheets

(56) References Cited

OTHER PUBLICATIONS

Philippe Flajolet, Eric Fusy, Olivier Gandouet, and Frederic Meunier. Hyperloglog: The analysis of a near-optimal cardinality estimation algorithm. In Proceedings of the 2007 International Conference on Analysis of Algorithms, 2007.
Philippe Flajolet and G. Nigel Martin. Probabilistic counting algorithms for database applications. J. Comput. Syst. Sci., 31 (2):182-209, Sep. 1985.
Frederic Giroire. Order statistics and estimating cardinalities of massive data sets. Discrete Applied Mathematics, 157:406-427, Jan. 2009.
Z. Karnin, K. Lang, and E. Liberty. Optimal quantile approximation in streams. In 2016 IEEE 57th Annual Symposium on Foundations of Computer Science (FOCS), pp. 71-78, 2016.
Nisheeth Shrivastava, Chiranjeeb Buragohain, Divyakant Agrawal, and Subhash Suri. Medians and beyond: New aggregation techniques for sensor networks. InProceedings of the 2nd International Conference on Embedded Networked Sensor Systems, SenSys '04, p. 239-249, New York, NY, USA, 2004. Association for Computing Machinery.

\* cited by examiner

EFFICIENT SET OPERATION EXECUTION ON STREAMING DATA USING SKETCHES

1. TECHNICAL FIELD

This disclosure relates to database operations, generally, and more specifically to techniques for executing set operation queries on streaming data using sketches.

2. BACKGROUND

A relational database stores data in tables that are organized into rows and columns. Queries may be performed on the data using a structured query language. A non-relational database provides a mechanism for storage and retrieval of data that is modeled in means other than the tabular relations used in a relational database.

Database set operations are used to query a database to find commonalities (intersect) and combinations (union) between multiple database records. The union set operation of two sets A and B, denoted A u B, is a set of all elements that are in A or in B. The intersect set operation of two sets A and B, denoted A n B, is all elements that are only in both A and B.

Streaming data is data that is continuously generated by different sources. However, traditional databases are not well suited for performing set operation queries on streaming data. Such queries performed on a traditional database storing streaming data may have problems relating to data freshness, missing records, and synchronization. Further, these queries require a great deal of storage space and take a long time to complete.

SUMMARY

Embodiments of the present disclosure provide techniques and systems for answering set intersection queries on streaming data. At least one of the queries requests cardinality of an intersection of a set of users whose values in a numerical field falls within a range of percentiles of the numerical field (hereinafter referred to as a numerical set) and at least one other set of the users. For example, the other set could also be a numerical set or a set of users who belong to a category in a categorical field (hereinafter referred to as a categorical set). Bottom-k sketches are generated from each of the sets, the bottom-k sketches for the numerical sets are enriched with information about the actual numerical values and estimated percentiles, the bottom-k sketches for the numerical fields are partitioned into bottom-k sketches for the numerical sets using the information, and the intersection is performed with respect to one or more of the smaller bottom-k sketches and any other non-enriched bottom-k sketch referenced by the query.

The information in the enriched bottom-k sketch allows update of the bottom-k sketch based only on the data kept in the sketch itself and avoids the need to make an additional pass through the whole data. Since the space requirements of a sketch is constant and significantly smaller than the actual data, the update time is also constant instead of being proportional to the data. As a result, the numerical thresholds for a numerical set can be updated at a considerably higher frequency (e.g., in at most a few seconds on demand).

According to an exemplary embodiment of the disclosure, a computer-implemented method for responding to a database query is provided. The method includes: the database query referencing a first set, a second set, and a desired quantile related to the first set from among a plurality of quantiles; generating a data structure including a bottom-k sketch of user identifiers (ids) of the first set and corresponding numerical values of the first set; partitioning the data structure into a plurality of sketches to correspond to the quantiles, respectively; determining an intersection of one of the sketches associated with the desired quantile and a sketch of the second set; and responding to the database query based on a cardinality of the intersection. In an embodiment, the cardinality of the intersection is estimated by determining the largest hash value x in the intersection, determining the number k of elements in the intersection, and calculating $(k-1)/x$.

According to an exemplary embodiment of the disclosure, a system for responding to a database query includes a client device and a server. The client device includes a graphical user interface configured to enable a user to enter a database query referencing first and second sets and a quantile associated with the first set, and a computer program configured to output the database query over a computer network. The server is configured to generate a data structure including a bottom-k sketch of the first set and corresponding numerical values of the first set, determine a subset of the bottom-k sketch whose numerical values correspond to the quantile, and transmit a computer message over the computer network to the client device including an answer to the query based on an intersection of the subset and a sketch of the second set. In an embodiment, the subset is a set of hash values kept in the bottom-k sketch.

According to an exemplary embodiment of the disclosure, a computer-implemented method for updating a database to store streaming data is provided. The method includes: receiving a data stream comprising a data point including a user identifier (ID) among a plurality of user ids and a numerical value for a numerical field; determining whether a data structure including a bottom-k sketch for the numerical field is present in the database; updating the data structure based on the user id and the numerical field, when it is determined that the data structure is present; and creating the data structure based on the data point for storage in the database, when it is determined that the data structure is not present.

BRIEF DESCRIPTION OF THE DRAWINGS

The detailed description describes embodiments with additional specificity and detail through use of the accompanying drawings, briefly described below.

DETAILED DESCRIPTION OF THE EXEMPLARY EMBODIMENTS

Figure 1:
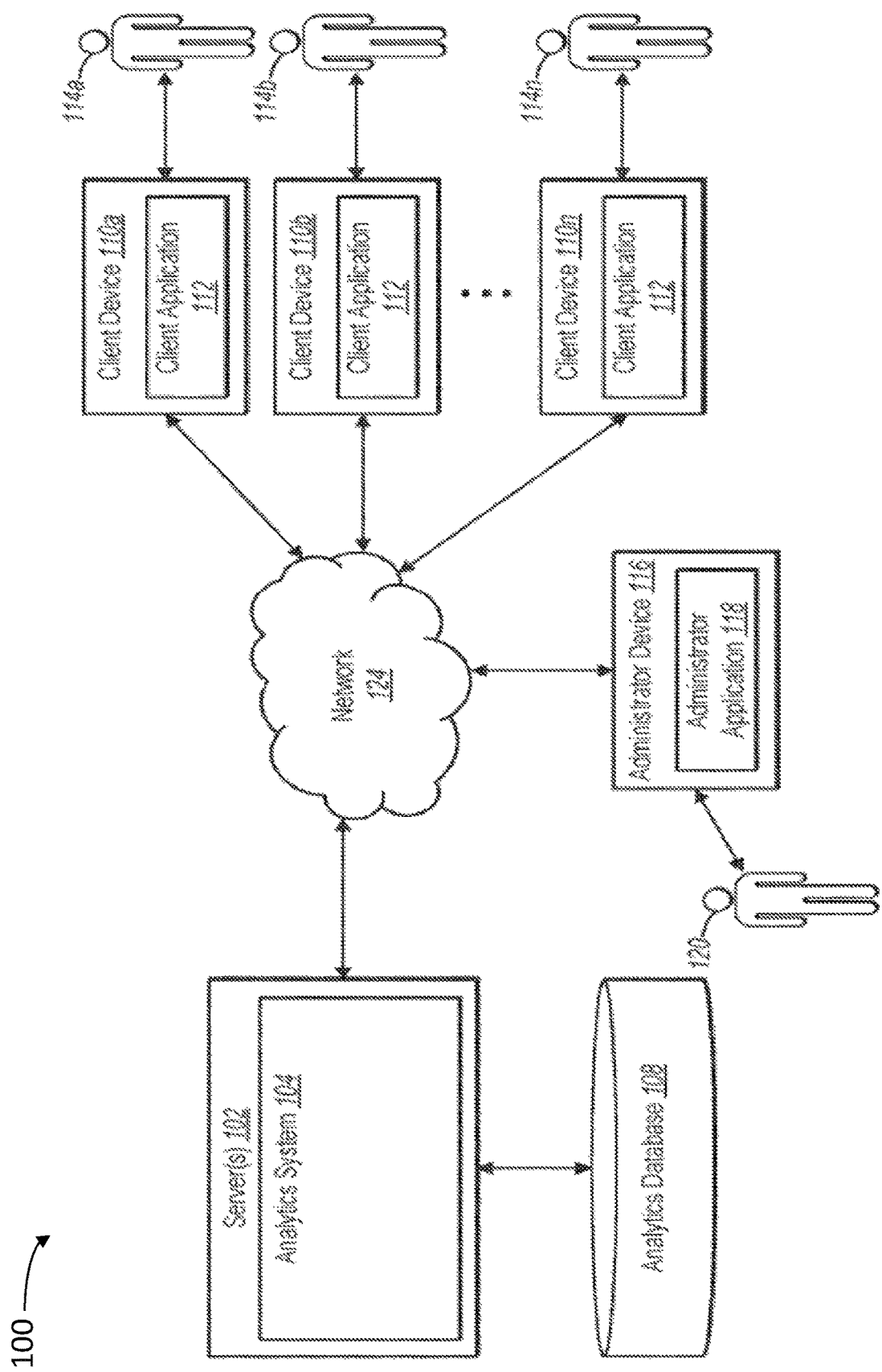
FIG. 1 is an illustration of an environment in an example implementation that is operable to employ techniques described herein.

Data analytics operate on a large amount of user data aggregated from multiple sources. From a marketer's point of view, it is extremely useful to be able to quickly determine a statistical summary from the aggregated data. In particular, it is useful to be able to answer set intersection queries for streaming data. An example of such a query is "How many users are in the US and among the top 25% spenders?" However, an intersection query based on streaming data can only access a limited amount of memory and needs to examine each data point once (i.e., a single pass algorithm). Since a large number of events need to be processed in a streaming environment, operating more than one pass on the input data is undesirable.

Unlike single set cardinality estimation, intersection size estimation requires the underlying data structures to keep track of mutual information among the sets. Moreover, when the intersection size is relatively small compared to the set sizes, obtaining an accurate estimator for the intersection is difficult. Further, as new data comes in, thresholds for defining percentiles also change, thereby changing set membership.

At least one embodiment of the disclosure uses a small amount of memory, only needs to examine each data point once, and produces a decent estimation of intersection cardinality while handling changing thresholds in numerical fields.

A prior approach estimated intersection cardinality of two sets using HyperLogLog (HLL) sketches. However, this approach may result in a large error when the union of the HLL sketches is large compared to the intersection of the HLL sketches.

At least one embodiment of the disclosure estimates intersection cardinality of two or more sets using bottom-k sketches. In bottom-k compared to HLL, the sketch of the intersection of the sets can be easily derived from the individual sketches of the respective sets. As a result, estimation of the intersection of the sets is more accurate using bottom-k sketches as compared with performing such estimation using HLL sketches. Further, an embodiment of the disclosure maintains sketches of numerical sets without having to make a pass through the whole data again, whereas the technique that uses HLL sketches requires a pass through the whole data every day to update sketches of the numerical sets. Moreover, an embodiment of the disclosure updates the numerical thresholds dynamically, whereas the technique that uses HLL sketches produces less accurate results since it keeps these thresholds fixed for a long period of time. When the data includes a plurality of data points, where each data point indicates a particular user and a certain numerical field, a pass through the whole data may include sequentially analyzing each of the data points to determine points corresponding to a certain numerical set, and then generating a sketch for each of a plurality of fixed numerical thresholds from the determined points. However, an embodiment of the disclosure can instead i) sequentially analyze each of the data points without considering fixed numerical thresholds to create an intermediate sketch; and ii) estimate the numerical thresholds and generate final sketches representing each of the estimated numerical thresholds from the intermediate sketch and the estimated numerical thresholds. Next, rather than re-perform the above step i) to update the intermedia sketch, the intermediate sketch is maintained, and the above step ii) is re-performed to update the estimated numerical thresholds and generate updated final sketches representing each of the updated estimated numerical thresholds from the maintained intermediate sketch and the estimated numerical thresholds. Thus, the final sketches can be periodically updated to reflect dynamic changes to the numerical thresholds without having to make a full pass through the data to update the intermediate sketch.

The following terms are used throughout the present disclosure:

The term "streaming data" may refer to content that is continuously delivered from a source device to a destination device over a computer network such as the Internet.

The term "set operation" may refer to a database operation that allows results of multiple queries to be combined into a single result set.

The term "intersection set operation" may refer to a set operation that determines the intersection (∩) of a plurality of sets by finding all elements common to each of the sets.

The term "cardinality of a set" may refer to a measure of a set's size or the number of elements within the set.

The term "sketch" may refer to a light-weight data structure that captures relevant aspects of the data and preserver statistical properties of the data. Examples of sketches include a Bottom-k sketch and a T-digest sketch.

The term "bottom-k sketch" may refer to a probabilistic data structure resulting from applying a hash function on all elements of a plurality of sets to assign each of the elements a number randomly between 0 and 1 and retaining the k smallest hash values.

The term "T-digest sketch" may refer to a data structure for estimating quantiles by representing the sets as samples in ascending order and grouping all of the samples into sub-sequences where sub-sequences near the end are forced to be small and sub-sequences in the middle are allowed to be larger.

The term "quantiles" may refer to cut points dividing the range of a probability distribution into continuous intervals with equal probabilities (e.g., {0-25%, 25-50%, 50-75%, and 75-100%}, {0-20%, 20-40%, 40-60%, 60-80%, 80-100%}, etc.).

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

FIG. 1 is an illustration of an environment 100 in an example implementation operable for responding to a set intersection query as described herein. As illustrated in FIG. 1, the environment 100 includes a server(s) 102, an analytics database 108, client device 110a-110n associated with users 114a-114n, an administrator device 116 associated with an administrator 120, and a network. The administrator device 116 may also be referred to as a client device.

Computing devices that are usable to implement the server(s) 102 and the client devices 110a-110n may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud".

The server(s) 102 is illustrated as including an analytic system 104. The analytics system 104 may expose content or functionality that is accessible via the network 124 by an application 112 of a client device (e.g., 110a). The application 112 may be configured as a browser, a network-enabled application, and so on, that provides streaming data to the server(s) 102 via the network 124.

The analytics system 104 receives streaming data from the client devices and queries from the administrator device 116. In an exemplary embodiment, the administrator device 116 includes a graphical user interface that enables an administrator 120 (e.g., a user) to enter the queries.

Figure 2:
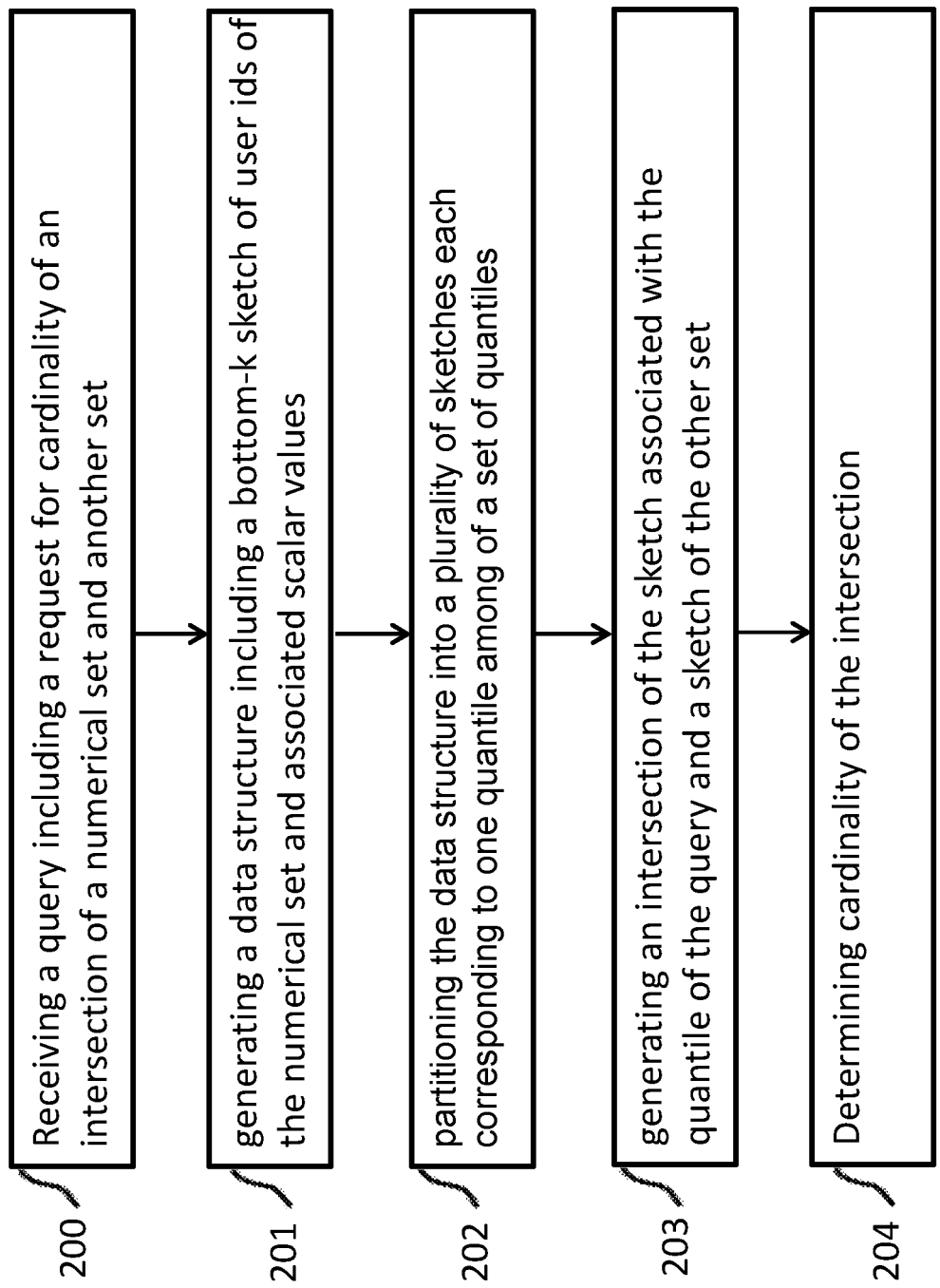
FIG. 2 illustrates a method of processing a query according to an exemplary embodiment of the disclosure.

FIG. 2 illustrates a method for responding to a query requesting cardinality of an intersection of a numerical set and at least one other set, according to an exemplary embodiment of the disclosure. A query that requests a count of users spending in the top 25% and living in the United States and is an example of the query because it includes an intersection of a numerical set of users spending in the top 25% and a categorical set of the users living in the United States. While a query intersecting a single numerical set and a single categorical set and a method of operating on the query will be discussed below for convenience, embodiments of the disclosure are not limited thereto. For example, the query may requestion intersection of two numerical sets, a single numerical set and a single non-numerical set, two numerical sets and a single non-numerical set, two or more numerical sets and two or more non-numerical sets, etc.

In an exemplary embodiment, the numerical set is a set of users whose numerical value (e.g., amount spent) in a numerical field (e.g., a spend data field) fall into one of a plurality of thresholds, ranges or quantiles (e.g., 0-25%, 25-50%, 50-75%, or 75-100%).

The data for each set may come from a stream of data where each data point is in the form u: $(f_1, f_2, \ldots, f_m)$. Here $f_1$ is a field corresponding to user u, where the field is categorical (e.g., device, country, browser type, etc.) or numerical (e.g., spending, position, screen measurements). In an embodiment, each data point includes a unique user identifier (id) and a numerical value. For example, the numerical value could be an index that uniquely represents a certain amount spent, a certain amount of income, etc. For example, the position could be a certain distance from an origin position, a specific latitude and/or longitude, etc. For example, if the query includes a single categorical set A and a single numerical set B, then |A∩B| is the intersection of the set A and set B.

The numerical set can change dynamically based on newly received data points. For example, users previously considered as spending more than 75% of other users (or spending in the top 25%) due to spending between $1000-$1100 could end up being shifted downward into a lower spending threshold such as only spending more than 50-75% of other users if new user data is processed indicating many new users are now spending $1200-$1300.

Figure 3:
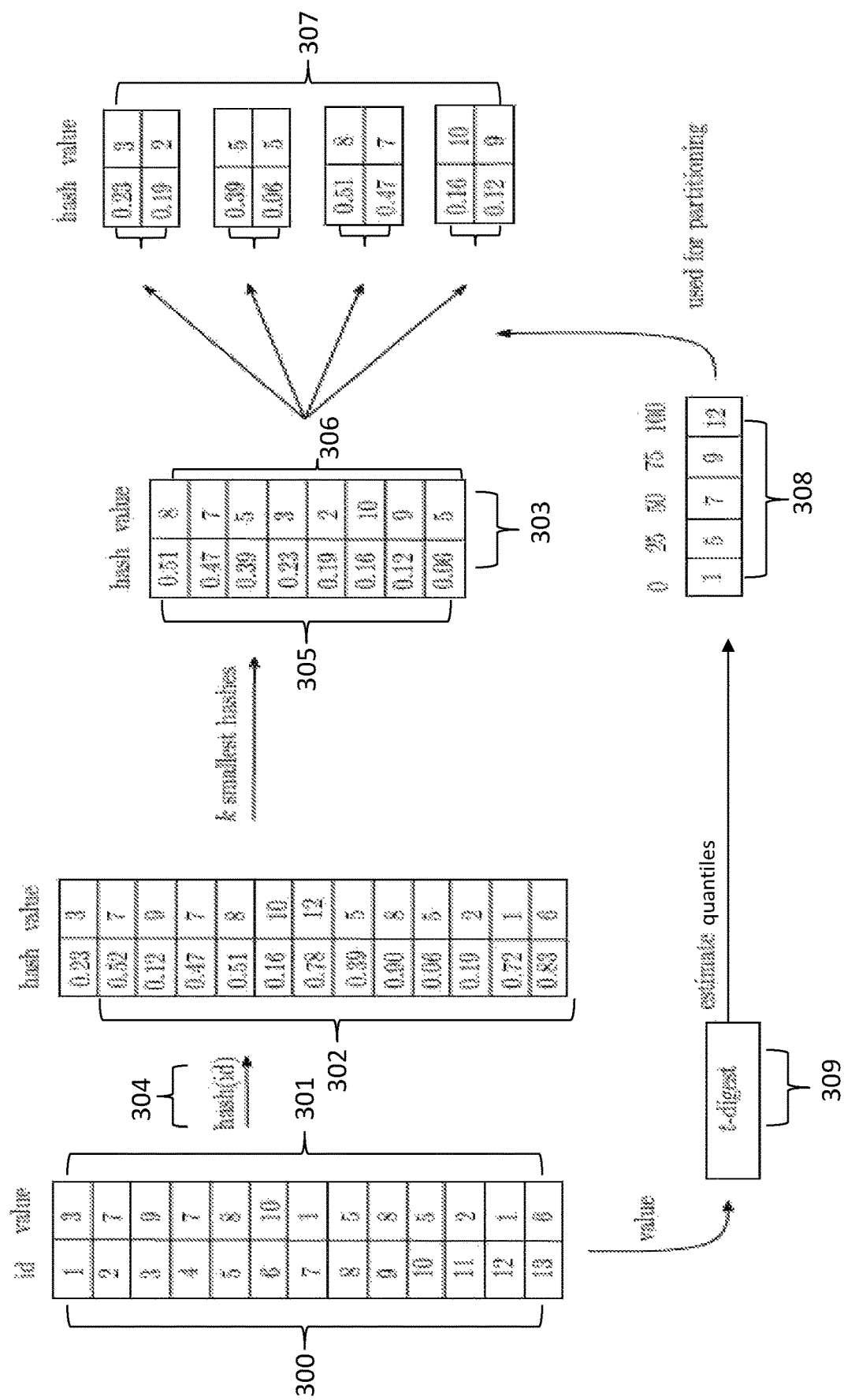
FIG. 3 illustrates generating sketches to be used in the method of FIG. 2 according to an exemplary embodiment of the disclosure.

The method of FIG. 2 includes receiving a query including a request for cardinality of an intersection of a numerical set and at least one other set (step 200). In an exemplary embodiment, the numerical set is a set of users or user ids associated with a given quantile (e.g., users in top 25%, bottom 10%, etc.). In an embodiment, the given quantile is determined by numerical values of a numerical field associated with the user ids. FIG. 3 illustrates an example of the user ids 300 and the numerical values 301.

The method of FIG. 2 includes generating a data structure including a bottom-k sketch of user ids of the numerical set and associated numerical values (step 201). The data structure may correspond to the above-described enriched bottom-k sketch. In an exemplary embodiment, the bottom-k sketch is generated by hashing the user ids of elements of the numerical set randomly or pseudo-randomly to a hash value between a lower limit and an upper limit to generate a plurality of hash values, and only retaining the bottom-k hash values.

FIG. 3 shows an example of the hash values 302, the data structure 303 (e.g., the intermediate sketch) including the bottom k-hash values 305 (or a bottom-k sketch), and the numerical values 306 associated with the bottom-k sketch. The numerical values 306 associated with the bottom-k sketch may be referred to as bottom-k numerical values since their count is the same as the bottom-k hashing values 305.

In an exemplary embodiment, the lower limit is 0, the upper limit is 1, and each hash value is a floating point (e.g., 0.01, 0.30, etc.) between 0 and 1. As shown in FIG. 3, a hashing function 304 is operated on each of the user ids 300 to generate the hash values 302. In an embodiment, the hashing function 304 includes a pseudo random number generator that generates a pseudo-random number from the user id, and then generates the hash value from the pseudo-random number. In an embodiment, the hashing function 304 generates the same hash value from the same user id, and the hash values 302 are unique from one another per numerical value.

For example, with reference to FIG. 3, when the numerical values 301 are amounts of money spent, the user having user id 1 has spent 3, the user having id 2 has spent 7, etc. For example, spending 3 could correspond to a user spending $300, spending 7 could correspond to a user spending $700. However, embodiments of the disclosure are not limited thereto. For example, a numerical value could directly correspond to the actual amount spent, be related to the amount spent using some transformation, or could correspond to some other value such as income level, amount saved, position, distance, etc.). As shown in FIG. 3, the data structure 303 includes k (e.g., 8) entries, where each entry includes a distinct one of the hash values 302 and a corresponding one of the bottom-k numerical values 306. In the example of FIG. 3, since k=8, the higher 9-13$^{th}$ hash values from among the original hash values 302 and the corresponding numerical values from among the original numerical values 301 are omitted from the data structure 303. The data structure 303 may also be referred to as a sketch or enriched bottom-k sketch.

The method of FIG. 2 further includes partitioning the data structure into a plurality of sketches each corresponding to one quantile among of a set of quantiles (step 202). In the example shown in FIG. 3, the data structure 303 is partitioned into sketches 307 (e.g., the final sketches) associated with quantiles 308. In an exemplary embodiment, the quantiles 308 are determined from a t-digest sketch 309 generated from the user ids 300 and the original numerical values 301. In an exemplary embodiment, the quantiles 308 are determined by determining a frequency distribution of the numerical values 301 and dividing the distribution into equal groups. For example, if there were 100 integer values, and the lowest 25 range from 1 to 21, the first next highest 25 range from 22-60, the second next highest 25 range from 61-90, and the top 25 range from 91-100, then the 0-25% quantile would correspond to numerical values ranging from 1 to 21, the 25-50% quantile would correspond to numerical values ranging from 22-60, the 50-75% quantile would correspond to numerical values ranging from 61-90, and the 75-100% quantile would correspond to numerical values ranging from 91-100. In an exemplary embodiment, the quantiles 308 are determined from a q-digest sketch, a Greenwald Khanna (GK) sketch, or an Manku-Rajagopalan- Lindsay (MRL) sketch generated from the user ids 300 and the original numerical values 301.

In the example shown in FIG. 3, the quantiles 308 are quartiles including a first quartile of 0-25%, a second quartile of 25%-50%, a third quartile of 50%-75%, and a fourth quartile of 75%-100%, but embodiments of the disclosure are not limited thereto. For example, the quantiles 308 may include more than four such as quintiles, deciles, etc. In FIG. 3, the first quartile corresponds to a first group of numerical values ranging from 0 to 4, the second quartile corresponds to corresponds to a second group of scaler values ranging from 5 to 6, the third quartile corresponds to a third group of scaler values ranging from 7 to 8, and the fourth quartile corresponds to a fourth group of scaler values ranging from 9 to 12.

For example, in FIG. 3, the data structure 303 is partitioned into a first sketch of the sketches 307 associated with the first quartile including hash entries having corresponding scalar values of 2 and 3 since the first group ranges from 0 to 4; a second sketch the sketches 307 associated with the second quartile including hash entries having corresponding scaler values of 5 since the second group ranges from 5 to 6, a third sketch the sketches 307 associated with the third quartile including hash entries having corresponding scaler values of 7 and 8 since the third group ranges from 7 to 8, and a fourth sketch the sketches 307 including hash entries having corresponding scaler values of 9 and 10 since the fourth group ranges from 9-12. While FIG. 3 shows the sketches 307 being included in a data structure additionally including the corresponding numerical values, in an exemplary embodiment, only the sketches (i.e., hash values) along with an index indicting its corresponding quantile is stored in memory to conserve storage space.

The method of FIG. 2 further includes generating an intersection of the sketch associated with the quantile of the query and a sketch of the other set (step 203). In an exemplary embodiment, when the other set is a categorical set its sketch is a bottom-k sketch. If the other set is also a numerical set, then the query would have additionally specified another quantile with respect to the other set. Then steps 201 and 202 would be applied to the other set to generate other sketches per quantile for the other set and the intersection would be performed on the sketch associated with the quantile among sketches 307 and the sketch associated with the other quantile among the other sketches.

The method of FIG. 2 further includes determining cardinality of the intersection (step 204). The cardinality provides a count of the elements in the intersection. For example, if the query asked for users living in the united states and also spending in the top 25 percent, then the cardinality of the intersection can be determined from the intersection of the sketch of the numerical set representing users spending in the top 25 percent and the sketch of the categorical set representing users living in the united states and from the hash values of the sketches. In an exemplary embodiment, the analytics system 104 provides a response (e.g., a computer message) to the query over the network 124 to the administrator device 116. For example, the response may include the intersection or the cardinality of the intersection. In an exemplary embodiment, the cardinality of a sketch is determined by calculating $(k-1)/x$, where x is the largest hash value and k is the number of elements kept in the sketch. In an exemplary embodiment, the cardinality of the intersection of multiple sketches is determined by performing an intersection operation on the sketches to generated an intersection sketch, determining the number k of elements in the intersection sketch, determining the largest hash value x in the intersection sketch, and calculating $(k-1)/x$.

In an alternate embodiment, the query of step 200 is replaced with a query that requests cardinality of a union of the numerical set and the other set. In this embodiment, steps 203 and 204 are replaced with a step of generating a union of the sketch associated with the quantile of the query and the sketch of the other set and determining cardinality of the union. In a variation on this embodiment, some elements of the union having hash values greater than a threshold are discarded before the cardinality is determined.

Referring back to FIG. 1, the data structure 303 and the sketches 307 may be generated by the analytics system 104 and stored in the analytics database 106. The query may be requested by the administrator device 116 using the administrator application 118. The client devices (e.g., 110*a*) may provide streaming data to the analytics system 104. The analytics system 104 may store the streaming data in the analytics database 106 or convert the streaming data into smaller sketches (e.g., bottom-k sketches) for storage in the analytics database 106. In an exemplary embodiment, the sketches are determined based on frequent queries. For example, if the administrator device 116 had previously queried about a set of users belonging to a certain category or a set of users belonging to a certain numeric range, the analytics system 104 can maintain sketches for each of these sets, and then update these sketches as new related data is received from the client devices. In an alternate embodiment, the sketches (e.g., data structures like 303) are created and updated independent of queries. In this embodiment, a new sketch is created whenever a new data point is received that includes a data field that has not been processed before. In an exemplary embodiment, rather than store the data points themselves, the analytics system 104 can instead conserve space by storing and updating corresponding sketches.

The data structure generated in step S201 of FIG. 2 may be updated upon receiving new data in a data stream. For example, with reference to FIG. 3, if a new data point having a user id of 14 were received hashing to a hash value of 0.01, if k remains 8, the highest entry of the data structure 303 (e.g., see entry having hash value 0.51) would be deleted, and a new entry having the hash value of 0.01 would be added as a first entry of the data structure 303. Since the added data could change the quantiles 308, new quantiles are estimated from the combination of the previous data (e.g., the user ids 300 and the numerical values 301) and new data. The revised data structure 303 can then be partitioned like in step S202 based on the new quantiles or the range scaler values associated with the new quantiles, to generate new sketches like sketches 307. In an embodiment, the prior sketches 307 are deleted and replaced with the new sketches to conserve on storage space.

In an exemplary embodiment, the analytics database 108 is configured to perform an intersection set operation on the above-described sketches. The intersection set operation may be more efficient and complete more quickly than an intersection set operation performed on traditional tables organized into rows and columns.

Figure 4:
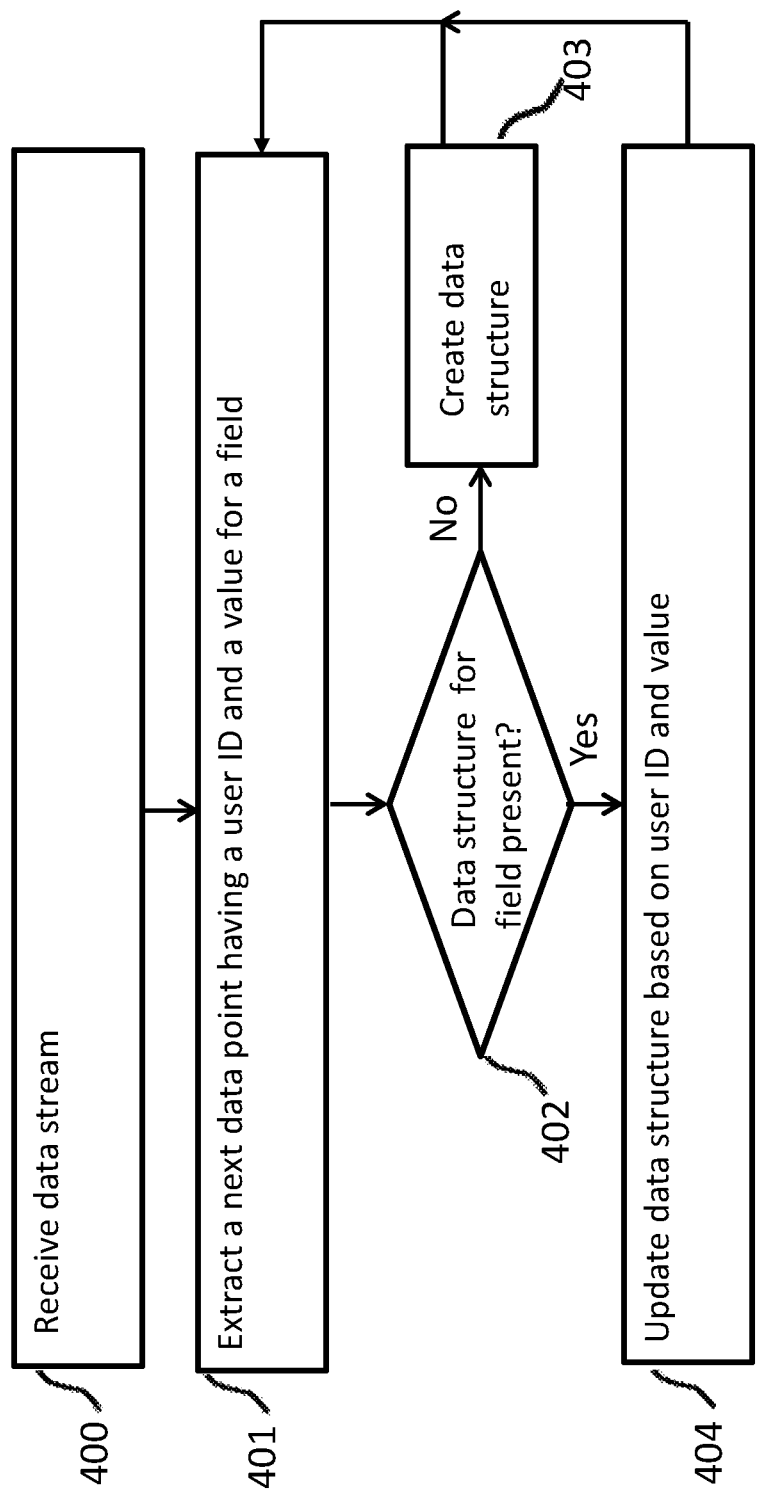
FIG. 4 illustrates a method of updating a database according to an exemplary embodiment of the disclosure.

FIG. 4 illustrates a method of updating a database upon receiving a data stream, according to an exemplary embodiment of the disclosure. The database is illustrated in FIG. 1 as the analytics database 108. The method of FIG. 4 includes receiving the data stream (step 400). The data stream includes one or more data points. In an exemplary embodiment, a data point includes a user ID and a value of a numerical field or a categorical field. Some of the numerical fields that are related to a particular quantile such as a spending amount in the top 25% have an associated data structure like the data structure 303 illustrated in FIG. 3. In an embodiment, the data structure is present in the analytics database 108 after a query related to the numerical field has been processed or after a data point including the numerical field has been processed. If the data structure is not present, a data structure for the data point is created automatically and stored in the database 108. The data stream may be received by the analytics system 104 across the network 124 from one of the client devices (e.g., 110a). The method of FIG. 4 further includes extracting a next data point from the data stream including a user ID and a value for a field (step 401). For example, the first data point is extracted a first time the extracting is performed, the second data point is extracted a second time the extracting is performed, etc. For example, the field could be a numerical field or a categorical field. The method of FIG. 4 further includes determining whether a data structure for the field is present (step 402). For example, if the field is a numerical field related to a particular quantile that was previously queried on, a data structure like the data structure 303 shown in FIG. 3 would be present. If the data structure is not present, a data structure like the data structure 303 is created for the extracted data point and stored in the database (step 403), and the method resumes to step 401 to extract the next data point. If the data structure is present, it is updated based on the user id and a value of the extracted data point, and the method resumes to step 401 to extract the next data point. For example, if the data structure 303 is present, then the user id is hashed to a hash value. If the hash value is a lowest k hash value among the existing hash values, then an entry of the bottom-k sketch 305 of the data structure 303 is replaced with an entry including the hash value and its corresponding numerical value. If the hash value is not a lowest k hash value, the bottom-k sketch 305 is left unchanged or is maintained.

Figure 5:
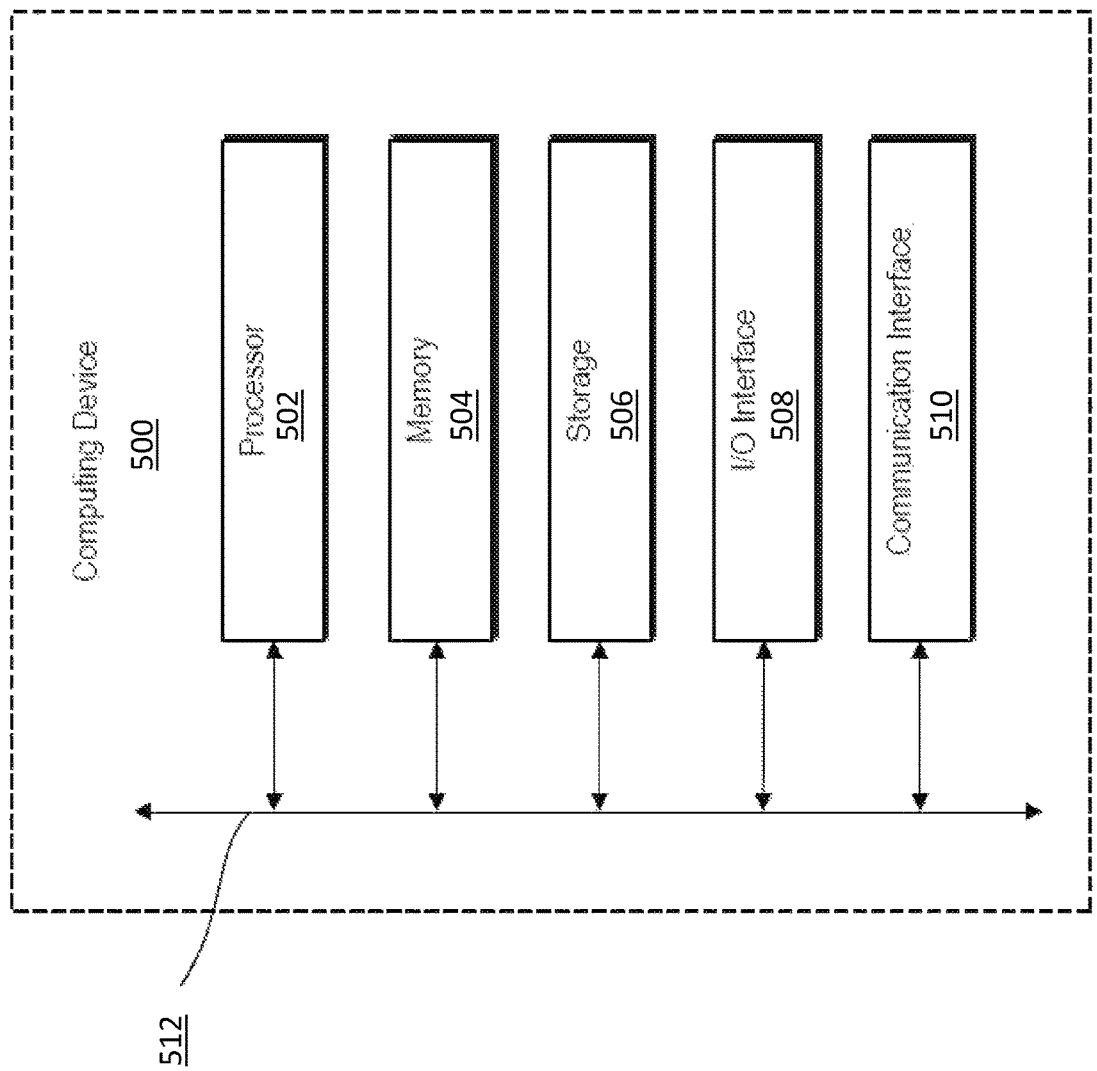
FIG. 5 illustrates an exemplary computing device that may be used to perform one or more methods of the disclosure.

FIG. 5 illustrates a block diagram of a computing device 500 that may be configured to perform one or more of the processes described above. One will appreciate that one or more computing devices, such as the computing device 500 may represent the computing devices described above (e.g., the client device 110a, the server 102, the administrator device 116). In one or more embodiments, the computing device 500 may be a mobile device (e.g., a mobile telephone, a smartphone, a PDA, a tablet, a laptop, a camera, a tracker, a watch, a wearable device, etc.). In some embodiments, the computing device 500 may be a non-mobile device (e.g., a desktop computer or another type of the client device 110a). Further, the computing device 500 may be a server device that includes cloud-based processing and storage capabilities.

As shown in FIG. 5, the computing device 500 can include one or more processor(s) 502, memory 504, a storage device 506, input/output interfaces 506 (or "I/O interfaces 506"), and a communication interface 410, which may be communicatively coupled by way of a communication infrastructure (e.g., bus 512). While the computing device 500 is shown in FIG. 5, the components illustrated in FIG. 5 are not intended to be limiting. Additional or alternative components may be used in other embodiments. Furthermore, in certain embodiments, the computing device 500 includes fewer components than those shown in FIG. 5. Components of the computing device 500 shown in FIG. 5 will now be described in additional detail.

In particular embodiments, the processor(s) 502 includes hardware for executing instructions, such as those making up a computer program. As an example, and not by way of limitation, to execute instructions, the processor(s) 502 may retrieve (or fetch) the instructions from an internal register, an internal cache, memory 504, or a storage device 506 and decode and execute them.

The computing device 500 includes memory 504, which is coupled to the processor(s) 502. The memory 504 may be used for storing data, metadata, and programs for execution by the processor(s). The memory 504 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 504 may be internal or distributed memory.

The computing device 500 includes a storage device 506 for storing data or instructions. As an example, and not by way of limitation, the storage device 506 can include a non-transitory storage medium described above. The storage device 506 may include a hard disk drive (HDD), flash memory, a Universal Serial Bus (USB) drive or a combination these or other storage devices.

As shown, the computing device 500 includes one or more I/O interfaces 506, which are provided to allow a user to provide input to (such as user strokes), receive output from, and otherwise transfer data to and from the computing device. 500. These I/O interfaces 506 may include a mouse, keypad or a keyboard, a touch screen, camera, optical scanner, network interface, modem, other known I/O devices or a combination of such I/O interfaces 506. The touch screen may be activated with a stylus or a finger.

The I/O interfaces 506 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 506 are configured to provide graphical data to a display for presentation to a user. The graphical data may be representative of one or more graphical user interfaces or any other graphical content as may serve a particular implementation.

The computing device 500 can further include a communication interface 510. The communication interface 510 can include hardware, software, or both. The communication interface 510 provides one or more interfaces for communication (such as, for example, packet-based communication) between the computing device and one or more other computing devices or one or more networks. As an example, and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI. The computing device 500 can further include a bus 512. The bus 512 can include hardware, software, or both that connects components of computing device 500 to each other.

At least one embodiment of the above-described method for answering set intersection queries can reduce database update time. For example, as the number of customer profiles increases, update time remains constant since space of sketches remains constant and an additional pass through the data is not needed. Further, the embodiment is more accurate and completes more quickly than a prior art technique that perform intersections with respect to HLL sketches. For example, the embodiment has a constant update time as the number of customer profiles increases, whereas the running time of the technique that uses HLL sketches grows linearly with the size of the data.

As discussed above, at least embodiment of the disclosure provides a method for responding to a database query referencing first and second sets that involves generating a data structure and partitioning the data structure into sketches. In an embodiment, the generating of the data structure includes: hashing user ids to a random value between 0 and 1 to generate hash values, selecting the k lowest hash values; and creating a plurality of entries, where each entry includes one of the selected hash values and a corresponding one of the numerical values. In one embodiment, the partitioning includes: determining a plurality of ranges of numerical values, where each range is associated with a different one of a plurality of quantiles; determining the entries having the numerical values in one of the ranges; and assigning the determined entries to one of the sketches associated with the quantile of the one range. In another embodiment, the partitioning includes determining a t-digest sketch of the first set and estimate the quantiles from the t-digest sketch. In an embodiment, the second set indicates user ids of users in one of a plurality of different categories.

The data structure in the method includes a bottom-k sketch of user identifiers (ids) of the first set and corresponding numerical values of the first set. In an exemplary embodiment, the second set includes second numerical values of a plurality of second user ids. In an exemplary embodiment, the method determines a sketch of the second set by: hashing each of the second user ids to a random value between 0 and 1 to generate hash values; selecting the k lowest hash values; and creating a plurality of entries, where each entry includes one of the selected hash values and a corresponding one of the second numerical values.

As discussed above, at least one embodiment of the disclosure provides a system for responding to a database query referencing first and second sets that transmits a computer message over a computer network including an answer to the database query based on an intersection of a subset generated from the first set and a sketch of a second set. In an embodiment, the answer includes a cardinality of the intersection. In an embodiment, the database query further references a third set and a server of the system determines an intersection of the subset, the sketch of the second set, and a sketch of the third set.

In an embodiment, the server determines the subset of a bottom-k sketch whose numerical values correspond to a certain quantile by determining a range of the numerical values of the first set that correspond to the quantile, and selecting entries of the bottom-k sketch whose numerical values fall within the range. In an embodiment, the server is configured to receive a data stream and update the range when a data point of the data stream references a same numerical field as the first set.

In an embodiment, the server is configured to receive a data stream and update the bottom-k sketch when a data point of the data stream references a same numerical field as the first set. In an embodiment, the server determines a second subset from the updated bottom-k sketch to correspond to the quantile and provides a second computer message over the computer network, upon receiving a second database query referencing the same first and second sets, where the second computer message includes an answer to the second database query based on an intersection of the subset and a sketch of the second set.

As discussed above, at least embodiment of the disclosure provides a method for updating a database. In an embodiment, the updating includes: hashing a user id to a random value between 0 and 1 to generate a hash value; replacing an entry of a bottom-k sketch with an entry including the hash value and a numerical value when the hash value is one of k lowest hash values among other hash values in the bottom-k sketch; and maintaining the bottom-k sketch when the hash value is not one of the k lowest hash values. In an embodiment, the method further includes: updating quantiles associated with a data structure based on a numerical value, when it is determined that the data structure is present, where the quantiles are used along with the data structure to respond to a database query associated with the numerical field.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

What is claimed is:

1. A computer-implemented method for responding to a database query, the method comprising:
    receiving the database query referencing a first set, a second set, and a desired quantile related to the first set from among a plurality of quantiles;
    generating a data structure including a bottom-k sketch of user identifiers (ids) of the first set and corresponding numerical values of the first set;
    partitioning the data structure into a plurality of sketches to correspond to the quantiles, respectively;
    determining an intersection of one of the sketches associated with the desired quantile and a sketch of the second set; and
    responding to the database query based on a cardinality of the intersection.

2. The computer-implemented method of claim 1, wherein generating the data structure comprise:
    hashing each of the user ids to a random value between 0 and 1 to generate hash values;
    selecting the k lowest hash values; and
    creating a plurality of entries, where each entry includes one of the selected hash values and a corresponding one of the numerical values.

3. The computer-implemented method of claim 2, wherein the partitioning comprises:
    determining a plurality of ranges of the numerical values, where each range is associated with a different one of the quantiles; and
    determining the entries having the numerical values in one of the ranges; and
    assigning the determined entries to one of the sketches associated with the quantile of the one range.

4. The computer-implemented method of claim 2, wherein the partitioning comprises:
    determining a plurality of ranges of the numerical values, where each range is associated with a different one of the quantiles; and
    determining the entries having the numerical values in one of the ranges; and
    assigning the hash values of the determined entries to one of the sketches associated with the quantile of the one range.

5. The computer-implemented method of claim 1, wherein the partitioning comprises:
   determining a t-digest sketch of the first set; and
   estimating the quantiles from the t-digest sketch.

6. The computer-implemented method of claim 1, wherein the second set indicates user ids of users in one of a plurality of different categories.

7. The computer-implemented method of claim 1, wherein the second set includes second numerical values of a plurality of second user ids.

8. The computer-implemented method of claim 7, wherein the determining of the sketch of the second set comprises:
   hashing each of the second user ids to a random value between 0 and 1 to generate hash values;
   selecting the k lowest hash values; and
   creating a plurality of entries, where each entry includes one of the selected hash values and a corresponding one of the second numerical values.

9. A system for responding to a database query, the system comprising:
   a client device comprising:
      a first memory storing a graphical user interface configured to enable a user to enter a database query referencing first and second sets and a quantile associated with the first set, and a first computer program configured to output the database query over a computer network; and
      a first processor configured to execute the graphical user interface and the first computer program; and
   a server comprising:
      a second memory storing a second computer program; and
      a second processor configured to execute the second computer program to generate a data structure including a bottom-k sketch of the first set and corresponding numerical values of the first set, determine a subset of the bottom-k sketch whose numerical values correspond to the quantile, and transmit a computer message over the computer network to the client device including an answer to the database query based on an intersection of the subset and a sketch of the second set.

10. The system of claim 9, wherein the answer includes a cardinality of the intersection.

11. The system of claim 9, wherein the database query further references a third set and the server determines the intersection of the subset, the sketch of the second set, and a sketch of the third set.

12. The system of claim 9, wherein the server generates the bottom-k sketch by hashing user ids of the first set to random values between 0 and 1 and retaining the k lowest values, where k is at least 2.

13. The system of claim 12, wherein the server determines the subset of the bottom-k sketch whose numerical values correspond to the quantile by determining a range of the numerical values of the first set that correspond to the quantile, and selecting entries of the bottom-k sketch whose numerical values fall within the range.

14. The system of claim 13, wherein the server is configured to receive a data stream and update the range when a data point of the data stream references a same numerical field as the first set.

15. The system of claim 13, wherein the range is determined from a t-digest sketch of the first set.

16. The system of claim 9, wherein the server is configured to receive a data stream and update the bottom-k sketch when a data point of the data stream references a same numerical field as the first set.

17. The system of claim 16, wherein the server determines a second subset from the updated bottom-k sketch to correspond to the quantile and provides a second computer message over the computer network to the client device, upon receiving a second database query referencing the same first and second sets, the second computer message including an answer to the second database query based on an intersection of the subset and a sketch of the second set.

18. A computer-implemented method for updating a database to store streaming data, the method comprising:
   receiving a data stream comprising a data point including a user identifier (id) among a plurality of user ids and a numerical value for a numerical field;
   determining whether a data structure including a bottom-k sketch for the numerical field is present in the database;
   updating the data structure based on the user id and the numerical field, when it is determined that the data structure is present; and
   creating the data structure from the data point for storage in the database, when it is determined that the data structure is not present,
   wherein the updating comprises replacing an entry of the bottom-k sketch with an entry including a hash value hashed from the user id and the numerical value of the numerical field when the hash value is one of k lowest hash values among other hash values in the bottom-k sketch.

19. The computer-implemented method of claim 18, wherein the updating further comprises:
   maintaining the bottom-k sketch when the hash value is not one of the k lowest hash values.

20. The computer-implemented method of claim 18, further comprising:
   updating quantiles associated with the data structure based on the numerical value, when it is determined that the data structure is present,
   wherein the quantiles are used along with the data structure to respond to a query associated with the numerical field.

* * * * *